No. 652,898. Patented July 3, 1900.
W. W. LIGHT.
NECK YOKE CENTER.
(Application filed Jan. 3, 1900.)
(No Model.)
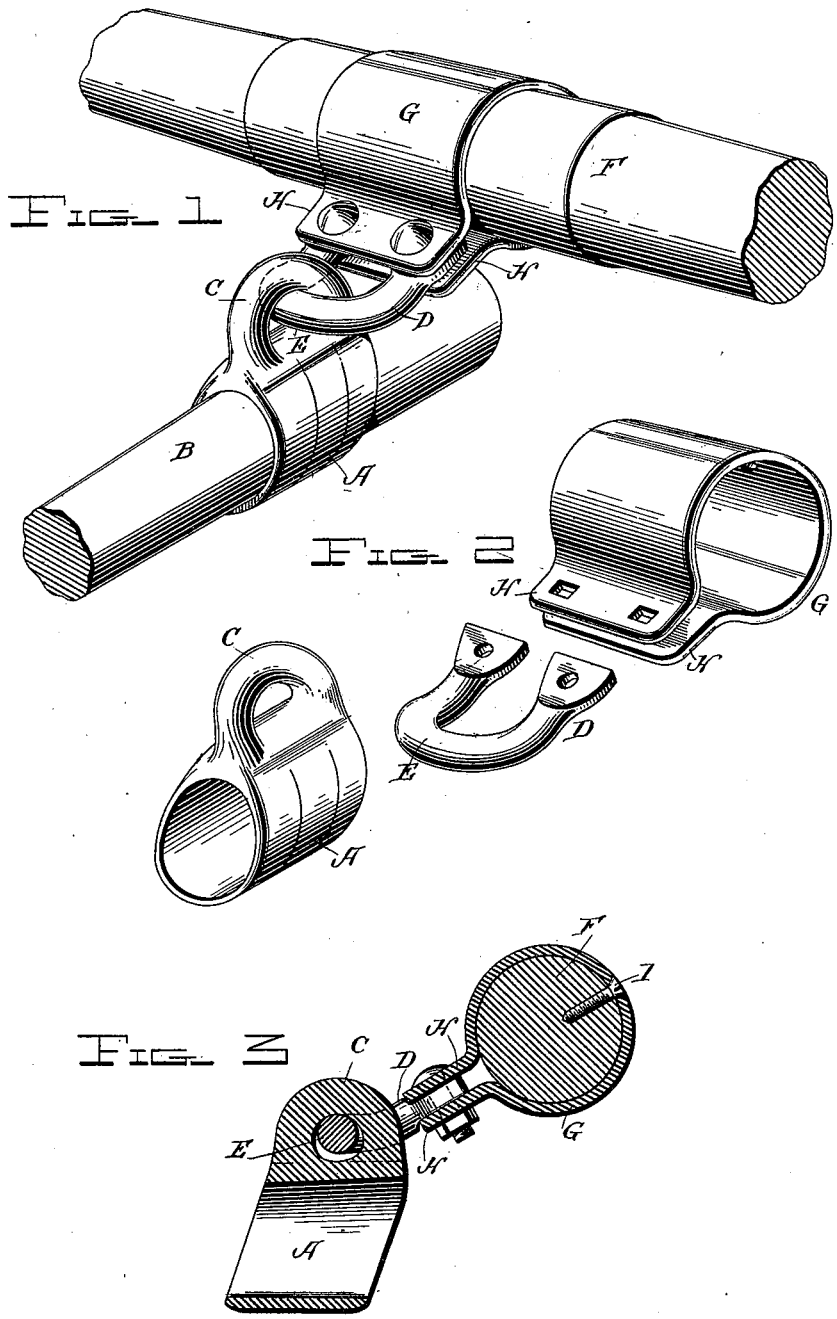
Witnesses
O. C. Jenkins,
D. E. Burdine
Inventor:
William W. Light,
by Dodge and Sons,
Attorneys.

UNITED STATES PATENT OFFICE.

WILLIAM W. LIGHT, OF RACINE, WISCONSIN.

NECK-YOKE CENTER.

SPECIFICATION forming part of Letters Patent No. 652,898, dated July 3, 1900.

Application filed January 3, 1900. Serial No. 238. (No model.)

*To all whom it may concern:*

Be it known that I, WILLIAM W. LIGHT, a citizen of the United States, residing at Racine, in the county of Racine and State of Wisconsin, have invented certain new and useful Improvements in Neck-Yoke Centers, of which the following is a specification.

My present invention pertains to improvements in neck-yoke centers, the construction and advantages of which will be hereinafter set forth, reference being had to the accompanying drawings, wherein—

Figure 1 is a perspective view of the device, a portion of the pole and neck-yoke being shown; Fig. 2, a similar view showing the parts in a detached relation, and Fig. 3 a sectional view.

The object of my invention is to produce a strong and efficient neck-yoke center or fastening in which the parts will have a free and easy movement one relative to the other, and, further, in so securing the device to the neck-yoke that the yoke is not cut away or the fastening device passed therethrough, which would ordinarily tend to weaken said yoke.

Referring to the drawings, A indicates a ferrule adapted to be mounted upon the pole-tip B, as is shown. Said ferrule is provided with an upwardly-extending loop C, formed integral therewith, and through said loop is passed a staple D. As will be noted more particularly upon reference to Fig. 3, the loop is formed at a slight angle with reference to the body of the ferrule and stands in a practically-vertical position with relation to the body of the pole.

The U-shaped staple D is curved, as illustrated in the drawings—that is to say, the outer closed section E is bent or curved upwardly, so that the major portion of the staple when the parts are in position lies practically in a horizontal plane.

In manufacturing the device the staple will preferably be passed through the loop and its ends flattened, as is most clearly shown in Fig. 2.

To secure the staple to the neck-yoke F, I employ a band or strap G, which is passed about and around said neck-yoke and has its ends H bent out away from the neck-yoke, so that they are parallel to each other. Between these ends H of the strap the ends of the staple D are introduced, and bolts, rivets, or other suitable securing devices are passed through the ends of the strap and also through the ends of the staple embraced therebetween.

By properly proportioning the parts the strap G may be drawn down tight upon the neck-yoke, thereby securely clamping the yoke and band or strap together. In order, however, to prevent any possible shifting of the band or strap G relatively to the yoke, a screw I may be passed through the band into the yoke, as is indicated in Fig. 3.

By reason of the curvature of the staple before noted the yoke is free to turn without any binding action whatsoever between the parts—that is to say, the curved portion of the staple, which lies in a practically-horizontal position when the yoke is in place, will turn freely in the loop, permitting what might be termed a "free swiveling action."

While it is preferable to employ the curved staple with the particular form of strap or band herein shown and described, it will readily be seen that the curved staple may be used with any other form of device capable of maintaining it in its proper relation to the neck-yoke, and I do not, therefore, desire to be understood as restricting myself to the use of this curved staple in combination with the other portions of the device herein set forth.

Having thus described my invention, what I claim is—

1. In a neck-yoke center, the combination of a ferrule; a loop extending up therefrom; and a staple passing through the loop, said staple having that portion which passes through the loop curved upwardly, substantially as described.

2. In a neck-yoke center, the combination of a ferrule; a loop extending up therefrom; a staple passing through said loop, said staple having that portion which passes through the loop curved upwardly substantially as described; and a strap or band G connected to the ends of the staple and adapted to be passed about and around a neck-yoke.

3. In a neck-yoke center, the combination of a ferrule A provided with an integrally-formed loop C; a staple D passing through said loop, said staple having that portion which passes through the loop curved upwardly substantially as described; a neck-yoke F; a strap or band G passing about said neck-yoke and having its ends H extending outwardly upon each side of the ends of the staple; and fastening devices passing through said ends H and the ends of the staple.

4. In combination with a neck-yoke, a staple secured thereto, said staple being curved upwardly at its outer end, substantially as and for the purpose described; and means for connecting said staple to a vehicle-pole.

In testimony whereof I have signed my name to this specification in the presence of two subscribing witnesses.

WILLIAM W. LIGHT.

Witnesses:
C. R. CARPENTER,
B. B. JONES.